United States Patent [19]
Vinson

[11] Patent Number: 5,445,221
[45] Date of Patent: Aug. 29, 1995

[54] CONTROLLING FERRIC IONS WHILE ACIDIZING SUBTERRANEAN FORMATIONS

[75] Inventor: Edward F. Vinson, Duncan, Okla.

[73] Assignee: Plainsman Technology, Inc., Marlow, Okla.

[21] Appl. No.: 230,749

[22] Filed: Apr. 21, 1994

[51] Int. Cl.⁶ ............................................. E21B 43/27
[52] U.S. Cl. .................... 166/279; 166/300; 166/304; 166/307
[58] Field of Search ............... 166/270, 271, 279, 300, 166/304, 307; 252/8.552, 8.553, 90, 151

[56] References Cited

U.S. PATENT DOCUMENTS

| | | | |
|---|---|---|---|
| 1,877,504 | 9/1932 | Grebe et al. | 252/151 X |
| 1,911,446 | 5/1933 | Grebe et al. | 252/8.553 |
| 2,402,596 | 6/1946 | Bolton | 252/151 |
| 2,963,439 | 12/1960 | Eberhard | 252/151 |
| 4,167,214 | 9/1979 | Street, Jr. | 166/307 |
| 4,442,014 | 4/1984 | Looney et al. | 252/8.553 |
| 4,679,631 | 7/1987 | Dill et al. | 166/307 |
| 4,683,954 | 8/1987 | Walker et al. | 166/307 |
| 4,823,874 | 4/1989 | Ford | 166/279 |
| 4,871,024 | 10/1989 | Cizek | 166/307 |
| 5,063,997 | 11/1991 | Pachla et al. | 166/279 |
| 5,084,192 | 1/1992 | Dill et al. | 252/8.552 |
| 5,112,505 | 5/1992 | Jacobs et al. | 252/8.552 |

OTHER PUBLICATIONS

"Acidizing Fundamentals", Williams et al., 1979, pp. 100–103.
"The Occurrence and Control of Acid–Induced Asphaltene Sludge", Houchin et al., SPE 19410, Feb. 22, 1990.
Chemical Abstracts, vol. 79, No. 34507s, 1973.
Chemical Abstracts, vol. 86, No. 109908d, 1977.
Chemical Abstracts, vol. 106, No. 70818d, 1987.
Chemical Abstracts, vol. 110, No. 85537t 1989.

*Primary Examiner*—George A. Suchfield
*Attorney, Agent, or Firm*—Thomas R. Weaver

[57] ABSTRACT

A composition for and method of treating a subterranean hydrocarbon producing formation is provided. The treatment, when conducted in the presence of ferric ions, prevents the development of insoluble ferric iron-containing compounds and also prevents the development of sludge in heavy crude.

20 Claims, No Drawings

CONTROLLING FERRIC IONS WHILE ACIDIZING SUBTERRANEAN FORMATIONS

BACKGROUND OF THE INVENTION

1. Technical Field of the Invention

This invention broadly relates to the reduction of ferric ions in aqueous acidic solutions. The invention also relates to the prevention of the formation of ferric iron-containing compounds in aqueous acidic compositions. This invention further relates to the treatment of a subterranean formation to stimulate the production of a fluid, such as a hydrocarbon, therefrom, wherein the treatment is conducted in the presence of iron-containing materials. This invention still further relates to the prevention of the formation of sludge in certain crude oils caused by the presence of ferric ions formed during the acid treatment of hydrocarbon-containing subterranean formations.

2. Description of the Prior Art and Problems Solved

It is well established in the prior art that the presence in aqueous acid solutions of dissolved iron in the ferric oxidation state can lead to the formation of ferric iron-containing compounds which produce insoluble iron solids when the pH of the acid solution increases to a value greater than about 4. In this regard Walker et al, in U.S. Pat. No. 4,683,954, and Dill et al, in U.S. Pat. No. 5,084,192, teach that ferric compounds, such as ferric hydroxide, begin to precipitate from hydrochloric acid solution when the pH of the acid increases to a value of about 2.5 and greater and that precipitation is complete when the solution pH is about 3.5. This precipitation phenomenon becomes a serious problem when an acid, such as hydrochloric acid, containing dissolved ferric iron is being used to react with a subsurface, acid soluble, calcareous formation, such as limestone, wherein the acid reaction causes the pH of the acid to typically spend to a value greater than about 4 or 5.

In addition to the precipitation problem discussed above, which can be caused by the presence of ferric ion in acid, it is taught by several authorities that hydrochloric acid having a high concentration, that is about 28% or more, can cause the development of sludge when the acid is placed in contact with certain types of crude oil. The sludge formation problem is exacerbated when the acid, which is in contact with the crude oil also contains ferric ion. In this connection see Houchin et al, "The Occurrence and Control of Acid-Induced Asphaltene Sludge," SPE 19410, February 1990; Dill et al, U.S. Pat. No. 5,084,192; Pachla et al, U.S. Pat. No. 5,063,997; and Ford, U.S. Pat No. 4,823,874.

For purposes of this invention, sludge is defined as a solid material formed in crude oil containing asphaltenes and maltenes which constituents may, under certain conditions, as pointed out above, precipitate from the crude oil. Sludge formed in crude oil while the crude oil is in a formation can render very difficult the task of recovery of the oil from the formation. Crude oil containing quantities of asphaltenes and maltenes subject to the production of sludge is referred to herein as heavy crude and sometimes as sludging crude.

Accordingly, the sludging problem specifically addressed herein is caused by the combination of acid, especially high concentration hydrochloric acid, and ferric ion in contact with a sludging crude. This problem is particularly severe when the sludge is produced during formation acidizing.

Formation acidizing or, simply, acidizing, is a method well known in the prior art utilized to increase the flow of fluid from a subterranean formation. According to the method, the formation is contacted with an acidic composition to react with and dissolve materials contained therein for the purpose of increasing the permeability of the formation. The flow of fluid from the formation is therefore increased because of the increase in formation permeability caused by the dissolution of the material. A known method of acidizing comprises the steps of conducting an acid composition to the formation through tubing disposed in a borehole penetrating the formation; forcing the acid composition into contact with the formation; and permitting the acid to react with and dissolve certain materials contained therein to thereby enlarge pore spaces within the formation and thus to increase the permeability thereof.

It is apparent that the object of formation acidizing, which is to increase formation permeability, can be frustrated if the very acid composition employed in the treatment to achieve the object, produces an environment which fosters the development of solid material which can fill and plug pore spaces in the formation, the consequent result of which is the failure to increase, and the possibility of even decreasing, formation permeability.

In the context of formation acidizing, ferric ion can be introduced into the acid as a result of reaction between ferric compounds, such as rust and millscale, on the interior wall of the conduit which conducts the acid to the formation, reaction of the acid with ferrous compounds in the formation followed by oxidation of ferrous ion to ferric ion and reaction between the acid and formation minerals that include ferric compounds, such as goethite, FeO(OH), magnetite, $Fe_3O_4$, and hematite, $Fe_2O_3$.

Solutions to the problems of precipitation of ferric iron compounds from spent acid and the formation of sludge induced by the contact between ferric ion and acid with sludging crude revolve about the control of ferric ion in acid and/or the elimination thereof from acid. Thus it has been suggested that ferric compounds should be removed from metal conduits, such as by pickling, prior to acidizing. Dill et al ('192) disclose the use of a blend of formic acid and acetic acid, in combination with anti sludge agents and iron control agents. Ford ('874) discloses the use of anti sludging agents, such as quaternary ammonium salts of fatty amines in hydrochloric acid. Crowe (U.S. Pat No. 4,574,050) discloses the use of an iron control agent, such as ascorbic acid and erythorbic acid, in hydrochloric acid. Pachla et al in U.S. Pat. No. 5,063,997 appear to disclose the reduction of ferric ion to ferrous ion in hydrochloric acid with hypophosphorous acid and a catalyst material selected from cupric and cuprous compounds Numerous other compositions and methods are disclosed in the art for controlling ferric iron in formation acidizing procedures. However, the need for other such compositions and methods remains and is not diminished.

SUMMARY OF THE INVENTION

It has now been discovered that a sulfur-containing, non-ionic, organic compound which is soluble in low pH aqueous solutions and while in the presence of a number of different acids having a low pH, such as those commonly employed in oil field stimulation operations, will rapidly reduce dissolved iron in the plus three oxidation state, ferric ion, to dissolved iron in the plus two oxidation state, ferrous ion. For convenience the compound is sometimes referred to herein as the ferric ion reducing agent of this invention.

In addition to the ability of the ferric ion reducing agent of this invention to reduce ferric ion to ferrous ion in the presence of aqueous media having a low pH, that is, less than 4, the compound, after the reduction, forms a reaction product which is also soluble in aqueous media over a broad pH range extending from acidic to basic. Thus, in view of the discovered properties of the ferric ion reducing agent of this invention and the reaction product, the compound finds particularly useful value in situations wherein the continued presence of ferric ion in low pH aqueous solutions can lead to the precipitation of ferric iron-containing compounds from aqueous solution at a pH of greater than about 4. Accordingly, the ferric ion reducing agent of this invention virtually immediately reduces ferric ion to ferrous ion in low pH environment which such compounds would precipitate upon the pH of the environment exceeding a value of about 4.

Also, since sludge can be induced by contacting heavy crude with concentrated acid especially in the presence of ferric ion, one cause of sludge inducement can be eliminated by including in the acid an effective quantity of the ferric ion reducing agent of this invention to thereby reduce any ferric ion present to ferrous ion. As used herein the term, concentrated acid, shall mean any acid having a concentration equivalent to 28% hydrochloric acid or greater.

In view of the discovery, referred to above, the invention herein is a composition for and method of preventing the formation of ferric iron-containing compounds in low pH aqueous solutions which contain ferric ions. In another aspect, the invention is a method of preventing the formation of ferric iron-containing compounds in aqueous acid solutions during the performance of conventional formation acidizing. In still another aspect, the invention is a method of preventing the formation of acid-induced sludge in heavy crude wherein the heavy crude and an aqueous acid contact each other in the presence of ferric ions such as may occur during the performance of formation acidizing or in crude oil storage tanks. The invention, in the various aspects mentioned above, relies upon the method step of contacting ferric ions with an aqueous acid composition comprising an aqueous acid solution containing the ferric ion reducing agent of this invention.

DESCRIPTION OF THE PREFERRED EMBODIMENTS

The ferric ion reducing agent of this invention, an acid soluble, sulfur-containing, non-ionic organic compound, is represented by the general formula:

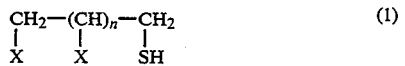

(1)

wherein n is a number in the range of from about 0 to about 4 and X is selected from the group consisting of H, OH, SH and mixtures thereof. It is preferred that at least one X in formula (1), above, be OH. It is still further preferred that n in formula (1), above, have a value in the range of 0 to 2 and more preferably that it have a value of 0. Examples of compounds within the scope of formula (1) include, but are not limited to, 1-mercapto-2-propanol, thioglycerol, 2-mercaptoethanol, 1,4-dithiothreitol, 1,4-dithioerythritol, thiosorbitol and 3-mercapto-1-propanol. The preferred compounds are thioglycerol and 2-mercaptoethanol with the latter being the most preferred.

It is apparent from the above that compounds preferred for use herein as the ferric ion reducing agent of this invention are sulfur-containing alcohols having in the range of from 2 to 4 carbon atoms per molecule.

In use an effective amount of the ferric ion reducing agent of this invention is dissolved in an aqueous acid solution having a pH of less than 4 and preferably less than about 2.5 whenever it is suspected that ferric iron compounds will precipitate from the solution if the pH of the solution exceeds a value of about 3.5 or more. The ferric ion reducing agent of this invention operates to substantially immediately reduce any ferric ions present in the acid solution to ferrous ions to thereby prevent the formation of ferric iron-containing compounds in the acid solution which would otherwise precipitate upon increase in solution pH.

It is preferred that the ferric ion reducing agent of this invention be dissolved in the acid solution prior to the introduction of ferric ions into the solution, but the reducing agent can be dissolved in an acid solution already containing ferric ions to thereby reduce the ferric ions to ferrous ions and thus prevent the formation of ferric iron-containing compounds. Accordingly, the order of mixing of the acid with the ferric ions and the ferric ion reducing agent is not a critical feature of this invention.

An effective amount of the ferric ion reducing agent required to perform as described above is believed to be an amount in the range of from about 10 to about 100 and preferably in the range of from about 15 to about 50 pounds of the reducing agent per 1000 gallons of the acid solution. Greater or lesser quantities of the ferric ion reducing agent can be employed and can be determined by ordinary laboratory experimentation as demonstrated in the examples provided below.

It is believed that the ferric ion reducing agent of this invention, upon reducing ferric ions to ferrous ions, forms dithio compounds which are soluble in aqueous solutions ranging in pH value from highly acidic to highly basic.

Accordingly, the ferric ion reducing agent of this invention is itself soluble in acidic media; it operates to prevent the formation of ferric compounds which are insoluble in aqueous solutions having a pH value greater than 4; and it produces a reaction product which is soluble in aqueous solutions ranging in pH value from highly acidic to highly basic.

The ferric ion reducing agent of this invention functions to reduce ferric ions to ferrous ions in both organic acids and inorganic acids and particularly in those acids which are commonly employed in oil and gas well stimulation treatments wherein the treating acid functions to dissolve portions of acid soluble subterranean formations. Such stimulation treatments are referred to in the art as formation acidizing and sometimes as fracture acidizing.

The reducing agent is operable as herein disclosed at temperatures of up to at least 150° F. and at acid strengths of up to 28% hydrochloric acid as well as in other acids of equivalent strength.

Specific acids in which the ferric ion reducing agent of this invention is known to be operable as disclosed herein include hydrochloric acid, acetic acid, formic acid, hydrofluoric acid and mixtures thereof. It is believed that other acids useful herein include hydroxyacetic acid, sulfuric acid, citric acid and phosphoric acid. Simple laboratory experiments, such as those disclosed herein, can be conveniently conducted to determine the operational details of the ferric ion reducing agent of this invention in various acids at different strengths.

It should be noted that some acids in which the ferric ion reducing agent can be employed, as disclosed herein, may cause secondary precipitates with materials dissolved by the acid if the strength of the acid exceeds certain threshold limitations. For example, Dill et al ('192) disclose that formic acid and acetic acid upon spending can cause precipitation of calcium salts if the concentrations of the acids exceed salt solubility. Thus, according to Dill et al, the concentration limits of formic acid and acetic acid to avoid precipitation of calcium formate and calcium acetate are 11% and 21%, respectively.

The acid solution preferred for use herein is hydrochloric acid having a concentration of less than 28% and preferably no less than about 15%.

It has been discovered that a combination of a catalytic material, sometimes referred to herein as a catalyst, and the ferric ion reducing agent is sometimes required in order to accelerate or othererwise promote the effective operation of the reducing agent to reduce ferric ions to ferrous ions in acid solution. In this regard, it has been observed that a combination of reducing agent and catalyst is required when the reduction occurs in an inorganic acid, such as hydrochloric acid; however, a combination is not required when the reduction occurs in an organic acid, such as acetic acid. It has also been observed that a combination of the ferric ion reducing agent of this invention and a catalyst is required when the reduction occurs in an acid solution which includes an inorganic acid and an organic acid. Accordingly, the effective amount of catalyst required is believed to be an amount in the range of from about 0 to about 1.0 and preferably from about 0.01 to about 0.06 pounds of catalyst per pound of ferric ion reducing agent. The amount of catalyst required, if any, can be conveniently determined in accordance with this disclosure and the illustrative examples provided below.

It has been discovered that the specific catalyst useful herein is an inorganic compound which, in low pH aqueous solution, will produce ionic species selected from the group consisting of $Cu^{+1}$, $Cu^{+2}$, $V^{+2}$, $V^{+3}$, $V^{+4}$ and $V^{+5}$. Compounds which will produce such species include cuprous chloride, cupric chloride, ammonium metavanadate, sodium metavanadate, vanadyl sulfate, vanadium pentoxide, vanadic oxide and vanadium chloride.

It is known that formation of sludge in a heavy crude can be induced by contacting the heavy crude with an aqueous acid solution, particularly when the acid is hydrocloric acid having a concentration of 28% or more. It is also known that sludge formation can be reduced, if not eliminated, by employing hydrochloric acid having a concentration of less than 28% in combination with an effective amount of a demulsifier. However, if the contact between the heavy crude, the acid solution and the demulsifier occurs in the presence of ferric ions, then a solid material can form in the mixture. It has been found that formation of the solid material referred to above can be completely prevented by including in the combination of the acid solution and demulsifier the ferric ion reducing agent of this invention together with the catalyst, as above described and in the amounts disclosed.

Accordingly, the formation of sludge in a heavy crude in contact with an acid composition in the presence of ferric ions can be prevented by including in the acid composition an acid solution which does not include 28% or more hydrochloric acid, the ferric ion reducing agent of this invention, a catalyst, if required, and a demulsifier.

The demulsifier employed can be any surfactant known in the art for preventing and/or breaking emulsions between aqueous acids and liquid hydrocarbons. A demulsifier preferred for use in this invention is a blend of anionic organic materials selected from alcohol ether sulfates, alkaryl sulfonates and aryl succinates commercially available from Plainsman Technology, Inc., of Marlow, Okla., under the trademark "AS-20A".

The quantity of demulsifier to be included in the acid composition is an amount in the range of from about 1 to about 50 and preferably from about 5 to about 20 gallons of demulsifier per 1000 gallons of acid solution.

Other ingredients known to be useful in acidizing compositions can be included in the acid composition of this invention without detrimental effect on the purpose of this invention which is to reduce ferric ions to ferrous ions. Such other ingredients include, among other things, acid corrosion inhibitors and solubilization agents.

The following examples are provided to illustrate the practice of the invention as well as certain preferred embodiments thereof. The examples should not be construed as limiting in any way the spirit or scope of the invention and are not provided as such a limitation.

EXAMPLE 1

An aqueous iron-containing acidic solution was prepared by mixing 1000 milliliters of 15 percent by weight aqueous hydrochloric acid with 28.70 grams of ferrous chloride tetrahydrate and 13.00 grams of ferric chloride hexahydrate. The resulting solution, which was bright yellow in color, contained 7500 weight parts ferrous iron per million weight parts of solution and 2500 weight parts ferric iron per million weight parts of solution.

To 100 milliliters of the above solution, which contained 16 grams of hydrogen chloride, 0.806 grams of ferrous iron and 0.269 grams of ferric iron and which was maintained at room temperature, there was added 0.10 milliliters of a 1.0 molar solution of cupric chloride (6.3 milligrams $Cu^{+2}$) and 0.50 milliliters of 2-mercaptoethanol (0.56 grams 2-mercaptoethanol).

Within a few seconds after addition of the 2-mercaptoethanol the color of the solution changed from the previously described bright yellow to clear and colorless to thereby indicate the reduction of ferric iron to ferrous iron.

EXAMPLE 2

A portion of the aqueous iron-containing acid prepared in Example 1, above, which had not been mixed with either 2-mercaptoethanol or cupric chloride was neutralized by permitting it to react overnight with white marble chips. After reaction the remaining chips were noted to be covered with a red coating. The red coating was believed to be a precipitate of ferric hydroxide and/or ferric oxide.

EXAMPLE 3

A portion of the aqueous iron-containing acid prepared in Example 1, above, which had been mixed with 2-mercaptoethanol and cupric chloride was neutralized by permitting it to react overnight with white marble chips. After reaction the remaining chips were white. There was no indication of any red coating on the chips.

Examples 1, 2, and 3 indicate that the ferric iron originally added to the aqueous iron-containing acid in Example 1 was reduced to ferrous iron upon addition thereto of 2-mercaptoethanol.

EXAMPLE 4

A. To a 50 milliliter sample of the aqueous iron-containing acid solution prepared in Example 1, above, which had not been mixed with 2-mercaptoethanol, there was added 50 milliliters of crude oil obtained from the San Andres formation in Yoakum County, Tex. A two phase liquid mixture was formed. The mixture was then shaken. After shaking, there was rapidly formed in the mixture about 40 milliliters of sludge in the form of a gelatinous solid. The sludge was only slightly soluble in xylene.

B. The experiment described in part A, above, was repeated except that a quantity of a commercially available demulsifier surfactant was added to the two phase crude oil-acid liquid mixture prior to shaking. The specific additive employed was 1.0 milliliter of a composition marketed by the Frac Tech division of Plainsman Technology, Inc., of Marlow, Okla., under the trade mark "AS-20A".

The crude oil-acid-surfactant mixture was shaken. A sludge, as described in part A, above, did not form, but, within a few hours after shaking, a layer of solid material did form at the interface of the crude oil phase and the acid phase. The layer of material possessed sufficient mechanical strength to enable its being removed wholly intact with tweezers.

C. The experiment described in part A, above, was repeated except that the acid solution employed did contain 2-mercaptoethanol and cupric chloride which was added thereto as described in Example 1. After shaking, it was noted that an emulsion of acid-in-oil had been formed, but there was no evidence of the sludge as described in Part A and no evidence of the solid material as described in Part B.

D. The experiment described in Part C, above, was repeated except that the acid solution employed also included "AS-20A" demulsifier as described in Part B, above, as well as the 2-mercaptoethanol/cupric chloride combination employed in Part C, above. After shaking, the resulting mixture rapidly separated into an oil phase and an acid phase. There was no evidence of the sludge as described in Part A, the solid material described in Part B, the emulsion described in Part C or the yellow color as described in Example 1.

The results of Example 4, parts A, B, C and D, clearly demonstrate that sludging and solids formation caused by the action of ferric ion on crude oils can be completely avoided by use of the ferric ion reducing agent of this invention, as described in Part C, and that the results can be enhanced by use of the ferric ion reducing agent of this invention in combination with a demulsifier as described in Part D.

EXAMPLE 5

The experiments described in Examples 1-3 were repeated except that 20 percent by weight aqueous hydrochloric acid was employed instead of the 15 percent acid as described in Example 1. All other conditions remained unchanged. The results obtained were identical to the results obtained in Examples 1-3.

EXAMPLE 6

The ability of a variety of additives to reduce ferric ion in various aqueous solutions of hydrochloric acid at various temperatures was tested as hereinafter described.

A solution of hydrochloric acid was prepared. A test additive was then mixed with the acid solution. The acid-additive solution was then heated to a stated test temperature and then maintained at the test temperature for about one hour. Thereafter, a sufficient quantity of ferric chloride was mixed with the heated acid-additive solution to produce a concentration of 1000 parts by weight ferric ion per million parts by weight of solution. The solution was then observed and the results recorded.

The content of the additives tested and their concentration in the acids are set forth in Table I, below. The acid concentrations, test temperatures, additive packages and test results are set forth in Table II, below.

TABLE I

| | GALLONS OF ADDITIVE PER 1000 GALLONS OF ACID | | | | |
|---|---|---|---|---|---|
| ADDITIVE | $CuCl_2$ 1 MOLAR | $SnCl_2$ 62% BY WEIGHT | 2-MERAPTOETHANOL | THIOGLYCOLIC ACID | HYPOPHOSPHOROUS ACID 50% BY WEIGHT SOLUTION |
| A | 2 | 0 | 5 | 0 | 0 |
| B | 2 | 0 | 0 | 5 | 0 |
| C | 0 | 5 | 0 | 0 | 0 |
| D* | 0 | 0 | 0 | 0 | 0 |
| E** | 2 | 0 | 0 | 0 | 5 |

FOOTNOTE:
*Control. Nothing added to acid solution.
**See U.S. Pat. No. 5,063,997 issued November 12, 1991 to Pachla et al

TABLE II

| RUN # | HCl conc % BY WT. | TEMP. °F. | ADDITIVE | OBSERVED CONDITION OF TEST SOLUTION AFTER ADDITION THERETO OF $Fe^{+3}$ |
|---|---|---|---|---|
| 1 | 15 | 150 | A | immediately became clear and colorless |

TABLE II-continued

| RUN # | HCl conc % BY WT. | TEMP. °F. | ADDITIVE | OBSERVED CONDITION OF TEST SOLUTION AFTER ADDITION THERETO OF $Fe^{+3}$ |
|---|---|---|---|---|
| 2 | 15 | 150 | B | immediately became clear and colorless |
| 3 | 15 | 150 | C | immediately became clear and colorless |
| 4 | 15 | 150 | D | solution clear and yellow |
| 5 | 20 | 150 | A | became clear and colorless in 1 minute |
| 6 | 20 | 150 | B | became clear and colorless in 1 minute |
| 7 | 20 | 150 | C | immediately became clear and colorless |
| 8 | 20 | 150 | D | solution clear and yellow |
| 9 | 28 | 150 | A | opaque solution and gummy precipitate present |
| 10 | 28 | 150 | B | solution clear and yellow |
| 11 | 28 | 150 | C | immediately became clear and colorless |
| 12 | 28 | 150 | D | solution clear and yellow |
| 13 | 20 | 120 | A | became clear and colorless in 10 seconds |
| 14 | 20 | 120 | B | became clear and colorless in 10 seconds |
| 15 | 28 | 120 | A | solution was cloudy before addition of $Fe^{+3}$, yellow and opaque after addition of $Fe^{+3}$ |
| 16 | 28 | 120 | B | solution clear and yellow |
| 17 | 28 | 120 | E | solution clear and yellow |

EXAMPLE 7

An aqueous iron-containing acidic solution was prepared by mixing 10 grams of acetic acid, 90 grams of water and sufficient ferric chloride to yield 2000 weight parts ferric ion per million weight parts of solution. The resulting solution was dark yellowish-brown in color.

To the above solution there was added 0.10 milliliters of a 1.0 molar solution of cupric chloride (6.3 milligrams $Cu^{+2}$) and 0.50 milliliters of 2-mercaptoethanol (0.56 grams 2-mercaptoethanol.)

Within a few seconds after addition of the 2-mercaptoethanol the color of the solution changed from the previously described dark yellowish-brown to clear and colorless to thereby indicate the reduction of ferric iron to ferrous iron.

EXAMPLE 8

An aqueous iron-containing acidic solution was prepared as described in Example 7, above. To the solution there was added 0.50 milliliters of 2-mercaptoethanol. Within a few seconds the color of the solution changed from dark yellowish-brown to clear and colorless to thereby indicate the reduction of ferric iron to ferrous iron in the absence of a catalyst material.

EXAMPLE 9

An aqueous iron-containing solution was prepared as described in Example 1. To 100 milliliters of the solution, which contained hydrogen chloride, ferrous iron and ferric iron in the amounts described in Example 1 and which was maintained at room temperature, there was added 20 milligrams of sodium metavanadate (8.4 milligrams $V^{+5}$) and 0.50 milliliters of 2-mercaptoethanol (0.56 grams).

Within a few minutes after addition of the 2-mercaptoethanol the color of the solution changed from bright yellow, as described in Example 1, to clear and pale blue-green to thereby indicate the reduction of ferric iron to ferrous iron.

EXAMPLE 10

An aqueous iron-containing solution was prepared as described in Example 1. To 100 milliliters of the solution, which contained hydrogen chloride, ferrous iron and ferric iron in the amounts described in Example 1 and which was maintained at room temperature, there was added 0.10 milliliters of a 1.0 molar solution of cupric chloride (6.3 milligrams $Cu^{+2}$) and 0.50 milliliters of thioglycerol (0.65 grams).

Within a few seconds after addition of the thioglycerol the color of the solution changed from bright yellow, as described in Example 1, to clear and colorless to thereby indicate the reduction of ferric iron to ferrous iron.

EXAMPLE 11

The ability of an additive this invention to reduce ferric ion to ferrous ion in various different aqueous acidic solutions at room temperature was tested as hereinafter described.

An aqueous solution of an acid was prepared. A sufficient quantity of ferric chloride was mixed with the acid solution to produce a concentration of 2000 parts by weight ferric ion per million parts by weight of solution. Thereafter the test additive was mixed with the acid-ferric chloride solution which was maintained at room temperature. The solution was then observed and the results recorded.

The test additive employed consisted of 0.50 milliliters of 2-mercaptoethanol (0.56 grams) and 0.1 milliliters of 1.0 molar cupric chloride (6.3 milligrams $Cu^{+2}$) per 100 milliliters of solution.

The acid solutions and the concentrations thereof and the test results are set forth in Table III, below.

TABLE III

| RUN No. | acid type | solution conc. % by wt. | Observation of Solution | |
|---|---|---|---|---|
| | | | before addition of Test Additive | after addition of Test Additive |
| 1 | acetic | 10 | brown | immediately became clear and colorless |
| 2 | formic | 10 | yellow | immediately became blue then changed to colorless and hazy |
| 3 | hydrochloric acetic | 15 5 | yellow | became clear and colorless in less than 10 seconds |
| 4 | hydrochloric hydrofluoric | 12 3 | yellow | became clear and colorless in less than ten seconds |

EXAMPLE 12

The ability of an additive of this invention to reduce ferric ion to ferrous ion in various different aqueous acidic solutions at room temperature was tested as hereinafter described.

An aqueous solution of an acid was prepared. A sufficient quantity of ferric chloride was mixed with the acid solution to produce a concentration of 2000 parts by weight ferric ion per million parts by weight of solution. Thereafter the test additive was mixed with the acid-ferric chloride solution which was maintained at room temperature. The solution was then observed and the results recorded.

The test additive employed consisted of 0.50 milliliters of 2-mercaptoethanol (0.56 grams) and 20 milligrams of sodium metavanadate (8.4 milligrams $V^{+5}$) per 100 milliliters of solution.

The acid solutions and the concentrations thereof and the test results are set forth in Table IV, below.

TABLE IV

| RUN No. | acid type | solution conc. % by wt. | Observation of Solution | |
|---|---|---|---|---|
| | | | before addition of Test Additive | after addition of Test Additive |
| 1 | acetic | 10 | brown | immediately became clear and pale blue-green |
| 2 | formic | 10 | yellow | immediately became blue then changed to clear and pale blue-green |

EXAMPLE 13

An aqueous, iron-containing, acidic solution was prepared by mixing aqueous hydrochloric acid, acetic acid, water and sufficient ferric chloride to yield 2% hydrochloric acid, 10% acetic acid and 2000 weight parts ferric ion per million weight parts of solution. To the solution there was added 0.50 milliliters of 2-mercaptoethanol. The color of the solution, which originally was dark yellowish-brown did not change in 30 minutes after addition of the 2-mercaptoethanol. Then 0.1 milliliters of 1.0 molar cupric chloride per 100 milliliters of solution was added. The solution immediately became clear and colorless to thereby indicate the reduction of ferric iron to ferrous iron in the presence of a catalyst material.

It will be apparent to those persons skilled in the art, in view of the above described invention and the preferred embodiments thereof, that many variations and changes may be made in the invention without departing from the teachings, spirit or scope thereof.

Having thus described the invention that which is claimed is:

1. A method of preventing the formation of ferric iron-containing compounds in an aqueous acidic solution containing ferric ions, said method comprising the steps of:

forming an acidic composition by mixing an aqueous acidic solution with a water soluble ferric ion reducing agent, placing said acid composition in contact with ferric ions and permitting said ferric ion reducing agent to reduce said ferric ions in said acidic composition to ferrous ions to thereby prevent the formation of said ferric iron-containing compounds;

said ferric ion reducing agent is a compound represented by the general formula

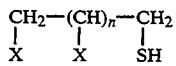

wherein n is a number in the range of from 0 to about 4, X is selected from the group consisting of H, OH, SH and mixtures thereof and the pH of said aqueous acidic solution has a value of about 4 or less.

2. The method of claim 1 wherein said acidic composition further includes an effective amount of a catalyst which will produce ionic species selected from the group consisting of $Cu^{+1}$, $Cu^{+2}$, $V^{+2}$, $V^{+3}$, $V^{+4}$, and $V^{+5}$.

3. The method of claim 2 wherein said ferric ion reducing agent is present in said acidic composition in an amount in the range of from about 10 to about 100 pounds of said reducing agent per 1000 gallons said acidic solution.

4. The method of claim 3 wherein said catalyst is present in said acidic composition in an amount in the range of from about 0.01 to about 0.06 pounds of said catalyst material per pound of said reducing agent.

5. The method of claim 4 wherein said acid in said aqueous acidic solution is selected from the group consisting of hydrochloric acid, hydrofluoric acid, formic acid, acetic acid, hydroxyacetic acid and mixtures thereof.

6. The method of claim 5 wherein X is H or OH and wherein said catalyst is cupric chloride.

7. The method of claim 6 wherein said aqueous acidic solution is a 15 percent by weight solution of hydrochloric acid, said reducing agent is 2-mercaptoethanol and said catalyst material is cupric chloride.

8. The method of claim 5 wherein at least one X in said general formula is OH.

9. The method of claim 8 wherein n in said general formula is in the range of 0 to 2.

10. The method of claim 8 wherein said reducing agent is selected from the group consisting of 2-mercaptoethanol, thioglycerol, 3-mercapto-1-propanol and 1-mercapto-2-propanol and said catalyst is cupric chloride.

11. A method of preventing the formation of sludge in a heavy crude in contact with an aqueous acidic solution containing ferric ions, wherein said method is comprised of the steps of:

forming an acidic composition by mixing an aqueous acidic solution with a water soluble ferric ion reducing agent, placing said acidic composition in contact with ferric ions and a heavy crude, and permitting said ferric ion reducing agent to reduce said ferric ions in said acidic composition to ferrous ions to thereby prevent the formation of said sludge;

said ferric ion reducing agent is a compound represented by the general formula

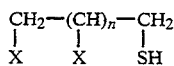

wherein n is a number in the range of from 0 to about 4, X is selected from the group consisting of H, OH, SH and mixtures thereof and the pH of said aqueous acidic solution has a value of about 4 or less.

12. The method of claim 11 wherein said acidic composition further includes an effective amount of a catalyst which will produce ionic species selected from the group consisting of $Cu^{+1}$, $Cu^{+2}$, $V^{+2}$, $V^{+3}$, $V^{+4}$, and $V^{+5}$.

13. The method of claim 12 wherein said ferric ion reducing agent is present in said acidic composition in an amount in the range of from about 10 to about 100 pounds of said reducing agent per 1000 gallons said acidic solution.

14. The method of claim 13 wherein said catalyst is present in said acidic composition in an amount in the range of from about 0.01 to about 0.06 pounds of said catalyst material per pound of said reducing agent.

15. The method of claim 14 wherein n in said general formula is in the range of 0 to 2.

16. The method of claim 15 wherein said reducing agent is selected from the group consisting of 2-mercaptoethanol, thioglycerol, 3-mercapto-1-propanol and 1-mercapto-2-propanol and said catalyst is cupric chloride.

17. A method of preventing the formation of ferric iron-containing compounds and the formation of sludge while treating a subterranean formation containing heavy crude with an aqueous composition in the presence of ferric ions, said method comprising the steps of:

forming an acidic composition by mixing an aqueous acidic solution with an effective amount of a water soluble ferric ion reducing agent, placing said acidic composition in contact with said formation permitting said acidic solution to dissolve portions of said formation and said ferric ion reducing agent to reduce said ferric ions in the presence said acidic composition to ferrous ions whereby the formation of ferric iron-containing compounds and the formation of said sludge is prevented;

wherein said ferric ion reducing agent is a compound represented by the general formula

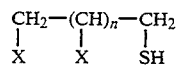

wherein n is a number in the range of from 0 to about 4, X is selected from the group consisting of H, OH, SH and mixtures thereof and the pH of said aqueous acidic solution has a value of about 4 or less.

18. The method of claim 17 wherein said acidic composition further includes an effective amount of a catalyst which will produce ionic species selected from the group consisting of $Cu^{+1}$, $Cu^{+2}$, $V^{+2}$, $V^{+3}$, $V^{+4}$, and $V^{+5}$ and wherein said catalyst is present in said acidic composition in an amount in the range of from about 0.01 to about 0.06 pounds of said catalyst material per pound of said reducing agent.

19. The method of claim 18 wherein said ferric ion reducing agent is present in said acidic composition in an amount in the range of from about 10 to about 100 pounds of said reducing agent per 1000 gallons said acidic solution, at least one X in said general formula is OH and n in said general formula is in the range of 0 to 2.

20. The method of claim 19 wherein said reducing agent is selected from the group consisting of 2-mercaptoethanol, thioglycerol, 3-mercapto-1-propanol and 1-mercapto-2-propanol and said catalyst is cupric chloride.

* * * * *